Jan. 12, 1932.  F. H. LEWIS  1,840,782
ANTISKID CHAIN
Filed June 11, 1930
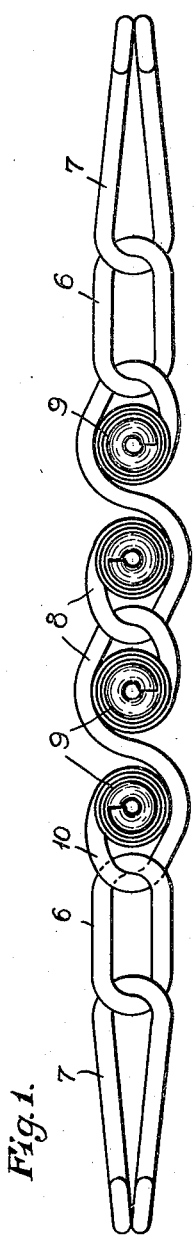
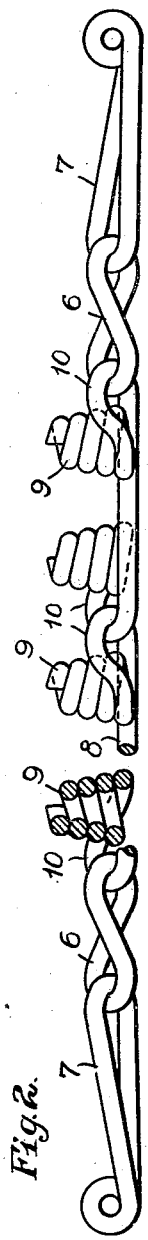
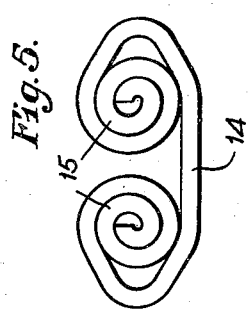
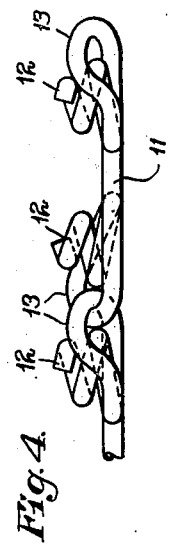
INVENTOR
Fred H. Lewis
By Archworth Martin,
Attorney.

Patented Jan. 12, 1932

1,840,782

UNITED STATES PATENT OFFICE

FRED H. LEWIS, OF YORK, PENNSYLVANIA, ASSIGNOR, BY MESNE ASSIGNMENTS, TO THE McKAY COMPANY, OF PITTSBURGH, PENNSYLVANIA, A CORPORATION OF PENNSYLVANIA

ANTISKID CHAIN

Application filed June 11, 1930. Serial No. 460,396.

My invention relates to anti-skid chains such as are employed on vehicle wheels, and more particularly to chains of the reinforced or calk type.

One object of my invention is to provide an anti-skid chain that is of longer life than various standard types and which offers more effective resistance to skidding.

Another object of my invention is to provide an anti-skid chain that possesses greatly increased wearing qualities with relatively small increase in the amount of material employed in the chain structure.

Still another object of my invention is to provide an anti-skid chain of generally improved character.

Some of the forms which my invention may take are shown in the accompanying drawings, wherein Figure 1 is a plan view showing a cross chain intended to lie across the tread of an automobile wheel or the like; Fig. 2 is a view thereof partially in side elevation, and partially in section; Fig. 3 is a plan view, showing a modified form of tread link; Fig. 4 is a side elevational view of the structure of Fig. 3; and Fig. 5 shows still another modification.

The cross chains or tread chains of anti-skid chain structures commonly lie across the tread of the wheel and are hooked at their ends to side chains or tension members. In the present case, the cross chain is composed of end links 6 to which are connected hooks 7 by means of which the cross chain may be attached to the usual side chains or tension members.

The intermediate portion of the cross chain and that portion which is brought into contact with the roadway for the purpose of preventing skidding and slipping of the wheel to which the cross chain is attached is shown as composed of links 8 that are twisted so that they will occupy approximately a common plane, as is usual in various standard types of cross chain links.

The links 8, however, distinguish from the usual type of cross chain link in that not only are they twisted, but they have their ends coiled to conical form as shown at 9, so as to protect protruding bends 10 of the links from engagement with the roadway until the coils 9 are worn down, the coils 9 being of course on the outer side of the chain.

It will be seen that the links are bent to approximately S form and that the ends thereof instead of being welded together to form a closed link, are bent to conical form so that there will be a number of thicknesses of metal to be worn through before the cross chain breaks, instead of a single thickness of metal as at the bends 10. The links will thus have a life determined by the amount of wear required to abrade away the outer turns of the coils 9 and the bent portions 10 of the links. The coils 9 further are very effective to prevent skidding or slipping of the wheel, since they constitute excellent biting surfaces for engagement with the roadway.

Referring now to Figs. 3 and 4, I show a structure wherein the links 11 are provided with coiled ends 12 and which are twisted as indicated by the numerals 13 that designate parts corresponding to the bends 10 of Fig. 2.

The convolutions of each coil 12 are of such size that they will nest within one another when compressed instead of being superposed upon one another as in the structure of Fig. 2. These coils 12 may be yieldable to provide a gripping effect of a different nature than that afforded by the coils 9 and, as in the case of the coils 9, will relieve the bends 13 of wear and therefore increase the life of the chain.

In Fig. 5, I show a link 14 which has coils 15 corresponding to the coils 12 of Fig. 3, or which may be of the form of the coils 9 of Fig. 2. This link, however, instead of being of S form has its one side straight and its ends bent back and coiled, the link being provided with the usual twists so that it and complemental links connected thereto will lie in approximately a given plane.

I claim as my invention:—

1. An anti-skid chain composed of links whose ends are bent to form conically-arranged coils extending outwardly from the plane of the link.

2. A chain link having a portion thereof bent to form a plurality of convolutions extending outwardly from the body of the link, the said convolutions being in the form of a cone.

3. An anti-skid chain link composed of a bar or wire bent to form link-engaging openings at the ends of the link, and one extremity of the bar being bent to form convolutions about an axis intermediate the ends of and perpendicular to the plane of the link.

4. An anti-skid chain link composed of a bar of wire bent to form link-engaging openings at the ends of the link, and one extremity of the bar being bent to form convolutions about an axis intermediate the ends of and perpendicular to the plane of the link, the said convolutions being in generally superposed relation but normally spaced apart.

5. An anti-skid chain link having one portion thereof bent to form a plurality of convolutions about an axis perpendicular to the plane of the link, the convolutions being in generally superposed relation, but normally spaced apart.

6. An anti-skid chain link composed of a bar or wire bent to form link-engaging openings at the ends of the link, and one portion of the bar being bent to form convolutions about an axis intermediate the ends of and perpendicular to the plane of the link.

7. A chain link consisting of a body portion having means at its ends for connection to adjacent links, and the link having convolute portions extending outwardly from the outermost plane of said body portion.

In testimony whereof, I, the said FRED H. LEWIS, have hereunto set my hand.

FRED H. LEWIS.